United States Patent
Fuller et al.

(10) Patent No.: US 6,931,052 B2
(45) Date of Patent: Aug. 16, 2005

(54) SYMBOL-DIRECTED WEIGHTING IN PARALLEL INTERFERENCE CANCELLATION

(75) Inventors: Arthur T. G. Fuller, Kanata (CA); Bradley J. Morris, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 770 days.

(21) Appl. No.: 09/998,564

(22) Filed: Nov. 16, 2001

(65) Prior Publication Data

US 2003/0095590 A1 May 22, 2003

(51) Int. Cl.[7] .......................... H04B 1/69; H04B 7/216
(52) U.S. Cl. ...................................... 375/144; 370/342
(58) Field of Search ................................ 375/130, 140, 375/144, 147, 148; 370/335, 342, 441

(56) References Cited

U.S. PATENT DOCUMENTS

| | | | | |
|---|---|---|---|---|
| 5,644,592 | A | | 7/1997 | Divsalar et al. ............ 375/206 |
| 6,014,373 | A | * | 1/2000 | Schilling et al. ............ 370/342 |
| 6,647,022 | B1 | * | 11/2003 | Mailaender ................. 370/441 |
| 6,661,835 | B1 | * | 12/2003 | Sugimoto et al. ........... 375/148 |

OTHER PUBLICATIONS

Mahesh et al., "Multistage Detection in Asynchronous Code-Division Multiple-Access Communication," IEEE Transaction on Comm., 1990, pp 509–519.*

Rezaaifar et al., "Multi-Stage Detection Scheme for CDMA System," IEEE 1997, pp 474–477.*

Fuller, Arthur et al., "3GTDD Feasibility," RF Head Study Report, Nortel Networks dabtd005—Issue BJM v0.1, Sep. 28. 2001.

Moshavi, Shimon, "Multi-User Detection for DS-CDMA Communications," IEEE Communications Magazine, pp. 124–136, Oct. 1996.

Xue, Guoqiang et al., "Adaptive Multistage Parallel Interference Cancellation for CDMA," IEEE Journal on Selected Areas in Communications, vol. 17, No. 10, pp. 1815–1827, Oct. 1999.

* cited by examiner

Primary Examiner—Tesfaldet Bocure
(74) Attorney, Agent, or Firm—Withrow & Terranova, PLLC

(57) ABSTRACT

The present invention provides for improved parallel interference cancellation. An input signal composed of multiple user signals is processed over a select time duration. The input signal is separated into individual signals corresponding to each of the multiple users and demodulated to recover symbols for each of the individual signals. The recovered symbols are processed based on the consistency of previous estimates of the given symbol to provide weighted symbol estimates. The respective weighted symbol estimates for each of the users are modulated with the appropriate coding and processed using channel estimates to create individual, regenerated signals. For each user, the regenerated signals for the other users are subtracted from the original input signal to form new individual signals. The new individual signals are each demodulated and reprocessed for multiple iterations. The output of the last iteration is used to form the final symbol decisions for each user signal.

32 Claims, 7 Drawing Sheets

| ITERATION | SYMBOL DIRECTED WEIGHTING | | | | | | | |
|---|---|---|---|---|---|---|---|---|
| 0 | $W_{00}$ | $W_{01}$ | $W_{02}$ | $W_{03}$ | $W_{04}$ | $W_{05}$ | $W_{06}$ | $W_{07}$ ... |
| 1 | $W_{10}$ | $W_{11}$ | $W_{12}$ | $W_{13}$ | $W_{14}$ | $W_{15}$ | $W_{16}$ | $W_{17}$ ... |
| 2 | $W_{20}$ | $W_{21}$ | $W_{22}$ | $W_{23}$ | $W_{24}$ | $W_{25}$ | $W_{26}$ | $W_{27}$ ... |
| 3 | $W_{30}$ | $W_{31}$ | $W_{32}$ | $W_{33}$ | $W_{34}$ | $W_{35}$ | $W_{36}$ | $W_{37}$ ... |
| 4 | $W_{40}$ | $W_{41}$ | $W_{42}$ | $W_{43}$ | $W_{44}$ | $W_{45}$ | $W_{46}$ | $W_{47}$ ... |

*FIG. 4*

LOOK-UP TABLE

SYMBOL-DIRECTED WEIGHTING IN PARALLEL INTERFERENCE CANCELLATION

FIELD OF THE INVENTION

The present invention relates to wireless communications, and in particular to enhancing parallel interference cancellation employed in code-division multiple access communication systems for the mitigation of multiple access interference.

BACKGROUND OF THE INVENTION

In code-division multiple access (CDMA) systems, multiple access interference (MAI) is a factor that contributes to a limitation in system capacity and performance. In an attempt to reduce the effect of this factor, one can employ some form of multi-user detection (MUD) algorithm. The basis of a typical MUD detector is the application of information known about other users to improve detection of each individual user. Of particular interest is the class of MUD detectors known as subtractive interference cancellation detectors. The fundamental principle behind these detectors is that an estimate is made of each individual user's contribution to the total MAI and then subtracted out from the received signal such that the MAI affecting each individual user is reduced.

If the estimation and subtraction of the MAI occurs in parallel for each user, the resulting detector is known as a parallel interference cancellation (PIC) detector. Typically, the detection process is carried out in an iterative manner, where the data decisions of the previous iteration are used as the basis for the next iteration's MAI estimates. In general, the reliability of these data decisions improves as the number of iterations increases. In a conventional PIC detector, each cancellation iteration involves an attempt to completely cancel out all MAI. For each individual user, this is accomplished by directly subtracting out the MAI estimates for all the other users. However, if the MAI estimate for a particular user is based on an incorrect data decision, then the interference power contributed by that user is artificially increased when interference cancellation is performed. If this artificial increase in MAI is to be minimized, a way to regulate the amount of MAI cancelled out based on the reliability of the underlying data decisions is needed.

Several techniques have been proposed for improving the conventional PIC detector by addressing the above problem. Particular reference is made to D. Divsalar, M. K. Simon, and D. Raphaeli, "Parallel Interference Cancellation For CDMA Applications," U.S. Pat. No. 5,644,592, Jul. 1, 1997; G. Xue, J. Weng, T. Le-Ngoc, and S. Tahar, "Adaptive Multistage Parallel Interference Cancellation for CDMA," IEEE J. Select. Areas Communs., vol. 17, no. 10, p. 1815–1827, October 1999; and D. Schilling, J. Kowalski, and S. Moshavi, "Spread Spectrum CDMA Subtractive Interference Canceller System," U.S. Pat. No. 6,014,373, Jan. 11, 2000, which are incorporated herein by reference in their entirety.

The most fundamental of these techniques is disclosed in U.S. Pat. No. 5,644,592 wherein a user-specific weighting factor is used to limit the amount of interference subtracted out of the incoming signal. The value of the weighting factor remains constant for the duration of an entire iteration and is typically increased monotonically as the number of iterations increases. In this way, the amount of interference cancelled out increases as the reliability of the data estimates increases. However, since the user-specific weighting factor remains constant over the duration of an entire iteration, the technique is based on the fundamental assumption that the reliabilities of a user's data estimates are identical over the course of an entire iteration. In general, this is not necessarily true. In an attempt to address this issue, a technique was proposed in "Adaptive Multistage Parallel Interference Cancellation for CDMA" that adjusted the weighting factor for each of the user's data estimates. The technique uses a least mean square (LMS) algorithm to update a user's weighting factor over the course of an entire iteration. However, note that because this adaptation occurs over the course of an entire iteration, the weighting factor is essentially adjusted for a given symbol based on the reliability of the data estimates that precede it. In general, there is not necessarily a relationship between the reliabilities of these estimates.

SUMMARY OF THE INVENTION

The present invention provides for improved parallel interference cancellation. An input signal composed of multiple user signals is processed over a select time duration. The input signal is separated into individual signals corresponding to each of the multiple users and demodulated to recover symbols for each of the individual signals. The recovered symbols are processed based on the consistency of previous estimates of the given symbol to provide weighted symbol estimates. The respective weighted symbol estimates for each of the users are modulated with the appropriate coding and processed using channel estimates to create individual, regenerated signals. For each user, the regenerated signals for the other users are subtracted from the original input signal to form new individual signals. The new individual signals are each demodulated and reprocessed for multiple iterations. The output of the last iteration is used to form the final symbol decisions for each user signal.

The weighting applied to each symbol to create the weighted symbol estimates is a function of previous symbol estimates. Weighting factors are maintained for each symbol. In one embodiment, the weighting factors are used to process the same symbol across multiple iterations to further define a weighting factor for each iteration. The weighting function may be implemented using, for example, a leaky integrator, an averaging integrator, or a look-up table. The primary performance benefit of symbol-directed weighting is to allow the level of cancellation to track symbol consistency over multiple iterations. Generally, the higher the consistency, the higher the level of cancellation and the lower the consistency, the lower the level of cancellation.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 4 illustrates unique weighting for each symbol of a particular user in a given time slot across multiple iterations of cancellation processing.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
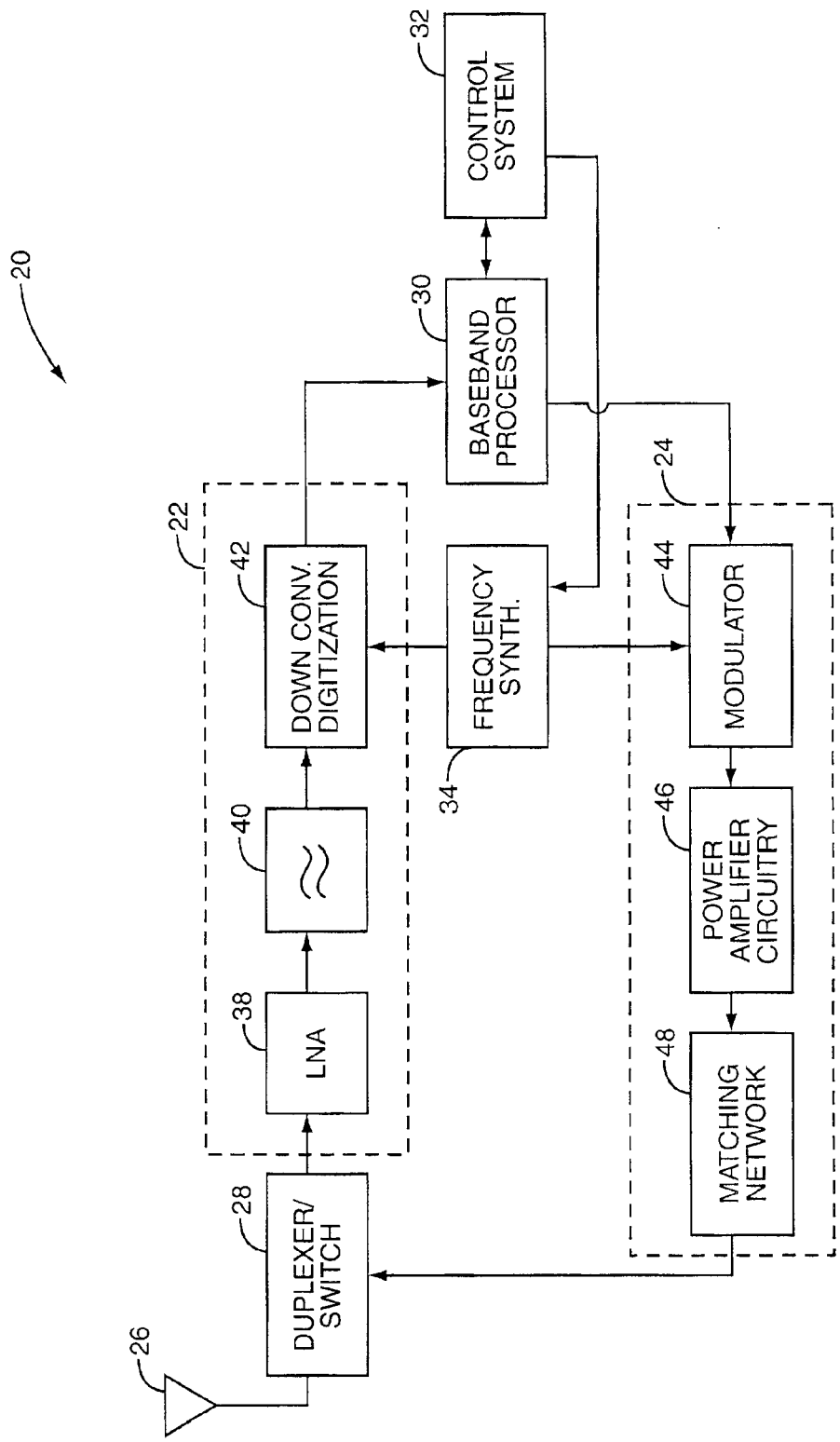
FIG. 1 is a schematic representation of a base station transceiver configured according to one embodiment of the present invention.

The present invention may be incorporated in a base station transceiver 20 as illustrated in FIG. 1 and including a receiver front end 22, a radio frequency transmitter section 24, an antenna 26, a duplexer or switch 28, a baseband processor 30, a control system 32, and a frequency synthesizer 34. The receiver front end 22 receives information bearing radio frequency signals from one or more remote transmitters provided by mobile terminals, such as mobile telephones, wireless personal digital assistants, or like wireless communication devices. A low noise amplifier 38 amplifies the signal. A filter circuit 40 minimizes broadband interference in the received signal, while downconversion and digitization circuitry 42 downconverts the filtered, received signal to an intermediate or baseband frequency signal, which is then digitized into one or more digital streams. The receiver front end 22 typically uses one or more mixing frequencies generated by the frequency synthesizer 34.

The baseband processor 30 processes the digitized received signal to extract the information or data bits conveyed in the received signal. This processing typically comprises demodulation, decoding, error correction, and inference cancellation operations. As such, the baseband processor 30 is generally implemented in one or more digital signal processors (DSPs), application specific integrated circuits (ASICs), and field programmable gate arrays (FPGAs). Further detail regarding the operation of the baseband processor 30 is described in greater detail below.

On the transmit side, the baseband processor 30 receives digitized data, which may represent voice, data, or control information from the control system 32, which it encodes for transmission. The encoded data is output to the transmitter 24, where it is used by a modulator 44 to modulate a carrier signal that is at a desired transmit frequency. Power amplifier circuitry 46 amplifies the modulated carrier signal to a level appropriate for transmission, and delivers the modulated carrier signal to antenna 26 through a matching network 48.

In a typical parallel interference cancellation (PIC) system, the input signal is composed of multiple (M) user signals separated by orthogonal codes. For a specific time duration, or slot, the input signal is separated into M individual signals corresponding to each of the multiple users and demodulated to recover K symbols for each of the M individual signals. In a "regeneration" process, the respective K symbols for the M users are remodulated using the appropriate spreading and scrambling coding and filtered using channel estimates to create M regenerated signals. For each user, the regenerated signals for the other M-1 users are subtracted from the original input signal to form M new individual signals. This last step is repeated for each user to create M individual signals for each of the M users.

These new individual signals are each demodulated and reprocessed, theoretically with higher reliability than in the previous step, for as many iterations as desired. The output of the last iteration is used to form the final symbol decisions from the each of the M user signals. The typical PIC scheme assumes full cancellation at each stage, and hence makes no distinction between the consistency of the symbols at different iterations. A survey of interference cancellation techniques for code-division multiple access (CDMA) is given in S. Moshavi, "Multi-User Detection for DS-CDMA Communications," IEEE Communications Magazine, October 1996, pp. 124–136, which is incorporated herein by reference.

Figure 2:
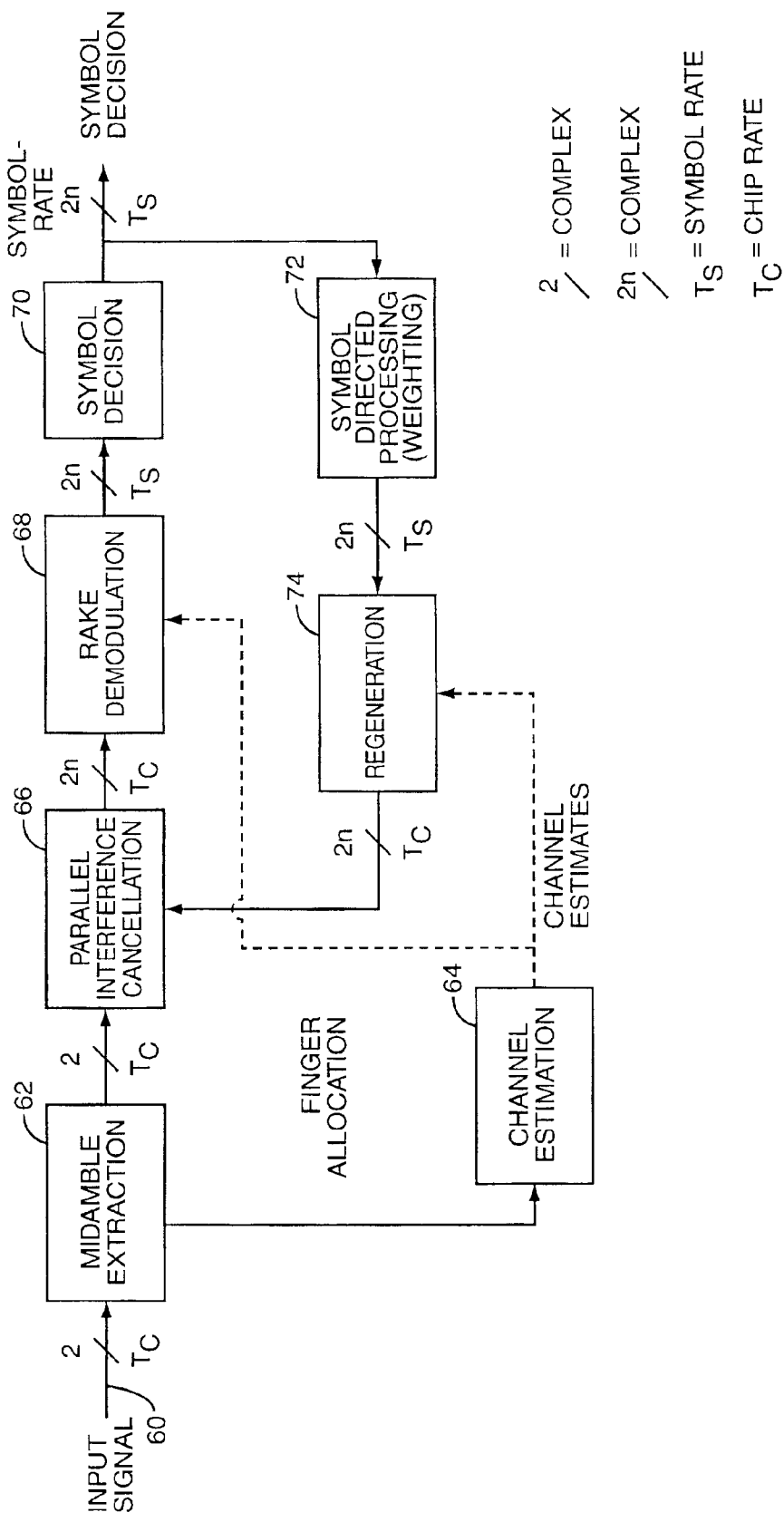
FIG. 2 is a schematic representation of multiple access interference cancellation circuitry according to one embodiment of the present invention.

The architecture representative of PIC detector circuitry for one embodiment of the present invention is illustrated in FIG. 2. This particular variant of PIC is referred to as "chip-level" PIC due to the fact that interference is cancelled at the chip-rate. While chip-rate cancellation is computationally intensive, it leads to a simple data path-oriented structure that remains relatively constant regardless of the given number of users and spreading factor combinations. The baseband processor 30 will preferably include the circuitry and software to implement the following structure or functionality. Those skilled in the art will recognize the numerous alternatives to the specifically disclosed structure and function. In general, the following functions are provided in hardware, software, or a combination thereof: Midamble extraction 62, channel estimation 64, parallel interference cancellation 66, rake demodulation 68, symbol decision 70, symbol-directed processing 72, and signal regeneration 74.

For the disclosed embodiment, the following assumptions are made. A single chip-rate PIC application specific integrated circuit (ASIC) is used to process all users for a single antenna. Moreover, it is assumed that the over-sampled, received signal is decimated to the chip-rate so that the input signal 60 is a composite signal represented by chip-rate complex samples. It is also assumed that channel estimation and other required pre-calculations occur during the reception of the second data field for a given time slot, and the processing of all data symbols for a given time slot occurs during the reception of data for the next time slot.

Initially, the midamble extraction function 62 extracts the midamble from the received input signal 60 for a given slot, and a channel estimate is obtained for each user from the channel estimation function 64 in traditional fashion. The channel estimates may be used for chip-rate finger allocation in the constituent rake demodulator 68 and directly or indirectly to define the filter coefficients for the regeneration function 74. Channel estimation may be accomplished using a "fast" cyclic correlator and additional processing to enhance the accuracy of the result.

Upon reception, the PIC function 66 is bypassed and rake demodulation 68 separates the composite input signal 60 into M individual signals corresponding to the respective signals for each user. To determine the individual signals for each user during subsequent iterations, the PIC function 66 subtracts the regenerated signals corresponding to all other individual signals from the composite input signal 60 for the given time slot. The regenerated signals for each user are fed back via the regeneration and symbol-directed processing functions 74, 72.

As noted, rake demodulation 68 is used to demodulate each individual user's signal from the composite input signal 60. Demodulation may include despreading each individual signal with a unique channelization code and descrambling all individual signals using the base station's descrambling code. This operation is preferably performed at the chip-rate, producing a complex, symbol-rate output. Symbol estimates for each user are determined by applying the symbol decision function 70 to the outputs of the rake demodulator 68 in traditional fashion. The symbol decision function 70 may be implemented in hardware using symbol detection circuitry.

Symbol-directed processing 72 is then performed on the symbol estimates in order to enhance cancellation performance. Although described in greater detail below, the symbol-directed processing 72 effectively provides a weighting for the latest symbol decision based on the consistency of previous estimates for the given symbol in earlier iterations. The symbol-directed processing provides individually weighted symbols based on the weighting and symbol estimate.

The regeneration function 74 essentially recreates estimates of the individual signals from the weighted symbols for each of the estimated users and individually processes the modulated symbols based on the corresponding channel estimates. Accordingly, regeneration 74 will typically involve the following steps for the symbols for each user:

receiving weighted symbols at a symbol rate spreading the weighted symbols with the user's specific chanelization code, scrambling the spread signal with a base station's complex code, and filtering the spread and scrambled signal with the user's channel estimate.

The output of the regeneration function 74 provides estimates for each of the individual signals received for each user. A technique has been proposed that significantly reduces the computational complexity of this regeneration operation 74 in related application TIME VARIANT FILTER IMPLEMENTATION, Ser. No. 10/001,877, filed Nov. 16, 2001, which is incorporated herein by reference. As noted above, each of the regenerated signals is individually sent to the PIC function 66. The outputs of the regeneration function 74 are complex signals at the chip-rate.

In a conventional PIC detector, each cancellation iteration typically involves an attempt to completely cancel out all MAI. For each individual user, this is accomplished by directly subtracting out the regeneration signals for all the other users. However, if the regenerated signal for a particular user is based on an incorrect symbol decision, then the interference power contributed by that individual signal is artificially increased when interference cancellation is performed in the PIC detector. In contrast, the present invention regulates the amount of MAI cancellation based on the consistency of the underlying symbol decision history.

Figure 3:
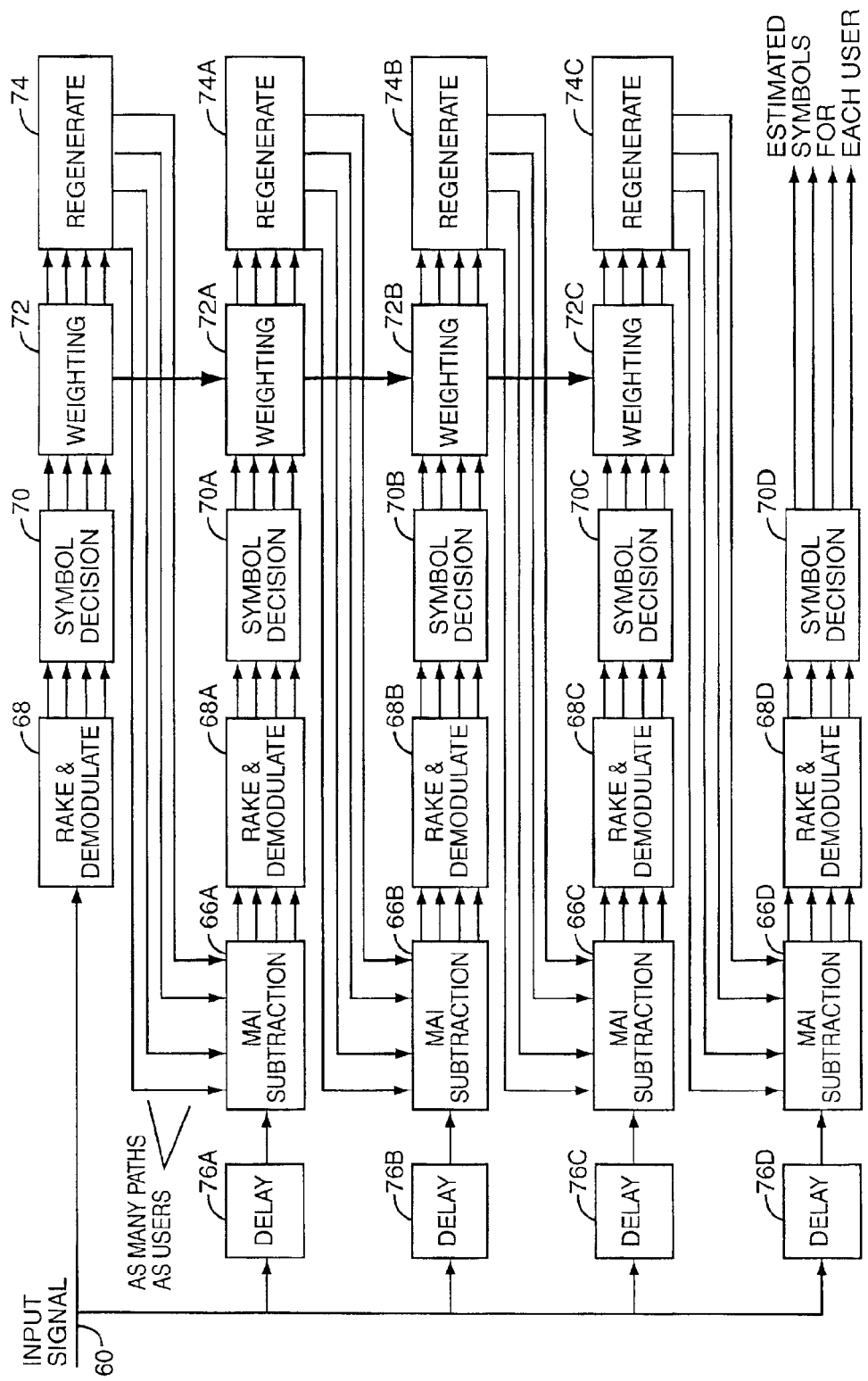
FIG. 3 is a logical illustration of a cancellation process for four users over four iterations according to one embodiment of the present invention.

FIG. 3 illustrates the logical flow of a four (4) user system taking four iterations to determine the estimated symbols for the respective signals associated with each user. Accordingly, the input signal 60 is composed of four user signals separated by orthogonal codes in a CDMA system. For a specific time period, or slot, the input signal 60 is stored and then separated into four individual signals corresponding to each of the four users and demodulated to recover symbols for each of the four individual signals using the rake demodulator function 68. Each symbol in each of the four demodulated signals is given a weighting based on the symbol-directed processing function 72. The weighting is based on the consistency of the past symbol decision history.

The weighted symbols for each of the four signals are then sent to the regeneration function 74, which will effectively spread, scramble, and filter as discussed above. For the first user, the regenerated signals for the second, third, and fourth users are subtracted from the stored, composite input signal 60 to form an estimate for the individual signal for the first user at the PIC function 66A. New representations of the individual signals are generated in similar fashion for the second, third, and fourth users.

Delay functions 76A through 76D represent storage of the original slot of the input signal 60. The letters "A," "B," "C," and "D," associated with reference numbers 66 through 76 indicate the first, second, third, and fourth iterations of the underlying functions. Accordingly, the PIC 66, demodulation 68, symbol decision 70, symbol-directed processing 72, and regeneration 74 functions are repeated a number of times. The output of the last iteration is used to form the final symbol decisions from the each of the four individual signals. Throughout each iteration, subsequent slots of data can be processed in parallel.

Except for the first pass through the system, the weighting provided by the symbol-directed processing function 72 preferably uses the information pertaining to previous symbol estimates from the symbol decision function 70 to drive a specific weighting for that particular symbol. Weighting factors are maintained for each symbol for each user in the slot being processed. For example, a channel may support 16 low-speed users with 64 symbols per slot or only 1 user with 1024 symbols per slot, or some combination therebetween. In any of these combinations, the total number of weighting factors remains less than or equal to 1024 and very manageable. These weighting factors are used to process the same symbol across multiple iterations to further define a weighting for each iteration that is appropriate for the sequence of symbols. FIG. 4 illustrates a symbol-directed weighting scheme for a slot over a number of iterations. Notably, each symbol has a dedicated weighting factor, W, which is affected by the weighting factors for that symbol from previous iterations.

Figure 5:
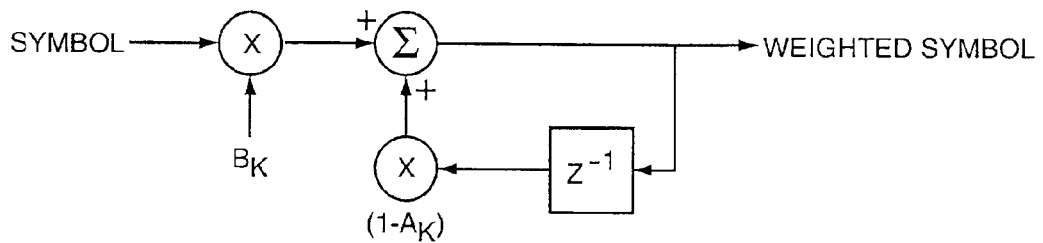
FIG. 5 is a representative schematic of a leaky integrator for weighting symbols according to one embodiment of the present invention.
Figure 6:
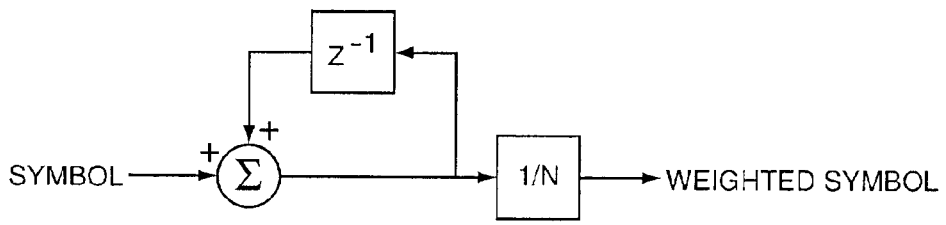
FIG. 6 is a representative schematic of an averaging integrator for weighting symbols according to one embodiment of the present invention.
Figure 7:
FIG. 7 is a representation of a look-up table (LUT) used for weighting symbols according to one embodiment of the present invention.
Figure 8:
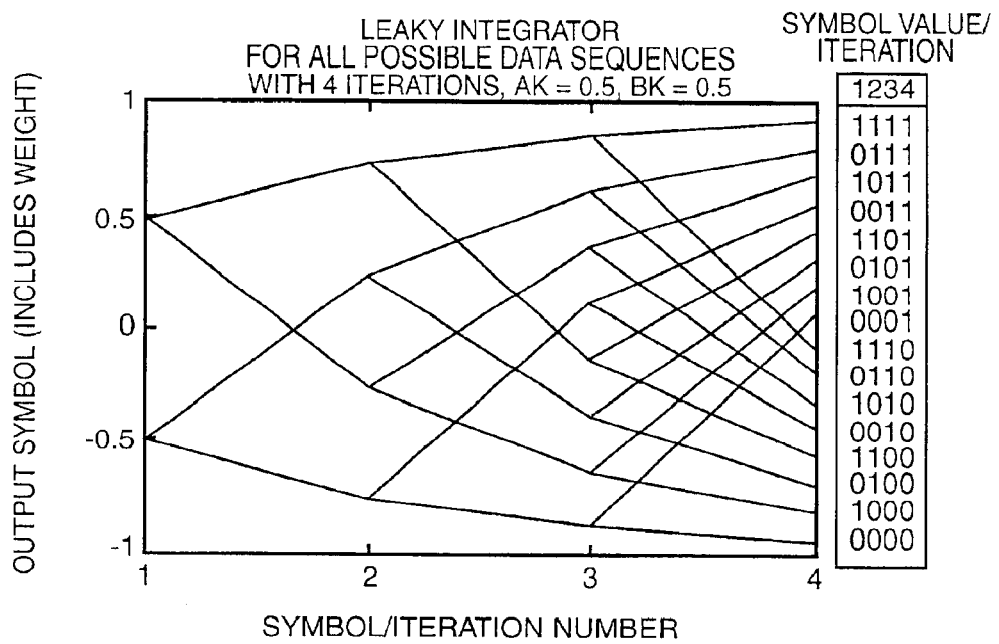
FIG. 8 illustrates a symbol directed weighting function across four iterations using a leaky integrator as illustrated in FIG. 5.
Figure 9:
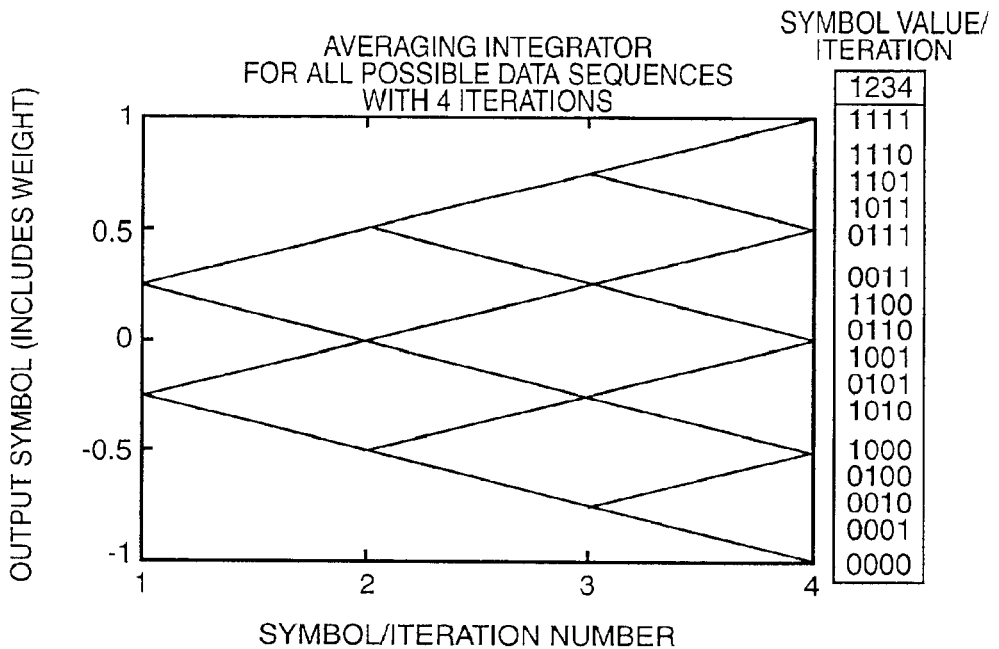
FIG. 9 illustrates a symbol directed weighting function across four iterations using an averaging integrator as illustrated in FIG. 6.

FIGS. 5, 6, and 7 illustrate three exemplary weighting functions: a leaky integrator (LI), an averaging integrator (AI), and a look-up table (LUT), respectively. The output of these functions provides a soft decision symbol based on the input symbol, which may be based on a hard decision or a soft decision history up to that point in processing. The soft decision symbol is a combination of a symbol and an effective weighting factor, which is used to drive the regeneration function 74 and subsequent cancellation PIC functions 66A through 66D. The primary performance benefit of symbol-directed weighting is to allow the level of cancellation performed at the PIC function 66 to track the symbol consistency over multiple iterations. Generally, the higher the consistency, the higher the level of cancellation; and conversely, the lower the consistency, the lower the level of cancellation. FIGS. 8 and 9 illustrate the trajectory of the LI and AI weighting functions over four iterations and all possible symbol sequences.

The leaky integrator can be tuned by controlling the gain (bk) and the memory (ak). When ak is equal to bk, the gain is normalized such that the final value approaches one, or minus one, for a consistent sequence of Binary Phase Shift Keyed (BPSK) symbols. Further when ak is equal to bk, a value of ak=0 results in no cancellation and hence is equivalent to a rake receiver or whatever detection and demodulation technique is being used. Conversely, when ak=1, full cancellation without memory occurs at each stage and hence is equivalent to full PIC. System performance is optimized when ak is initialized to a known generally good value, such as 0.5, and optimized over successive slots to reduce the bit error rates (BER), perhaps using a least mean square (LMS) algorithm.

Another possibility is to vary ak from iteration to iteration, to allow early convergence (ak being large) in the first few iterations with fine tuning in the last few iterations (ak being small). In this case ak would likely be fixed at each iteration.

The averaging integrator would only change nominally with the number of iterations being performed (N) such that a sequence of the same symbols would result in a weight of 'one' at the final iteration. A further variation of the averaging integrator can be envisioned where an offset is instigated by the value of the first symbol and the averaging N is increased (beyond the number of iterations) so that the final weight is also 'one' if subsequent symbols are the same. The potential benefit of this approach is to bias the weighting factors away from zero, which is effectively no MAI reduction.

The look-up table approach would allow arbitrary optimization of the weighting functions without the requirement of a simple compact function. Many approaches could be used to optimize the look-up table contents, for example, a Genetic Algorithm. It could also be envisioned that the look-up table could be enhanced on the fly in an operating parallel interference canceller. The width of the entries in the look-up table would be determined by the desired resolution of the output weighting factors. The number of entries in the look-up table, assuming a binary symbol, is:

$$entries = \sum_{i=1}^{N-1} 2^i,$$

where N is the number of iterations performed. For N=4, 30 entries are required. Notably, a common look-up table may be used for all symbols as long as the addressing for a particular symbol is associated with its symbol history to achieve individualized weighting.

The invention can be easily applied to multi-level modulation schemes by using slightly modified or different weighting functions. These are just three of the possibilities for symbol-directed weighting. After a review of the present disclosure, one of ordinary skill in the art could envision other schemes that would perhaps reduce implementation cost and increase performance or some other desirable set of characteristics.

A number of enhancements can be used to increase the performance of the proposed architecture. One possible enhancement is to make use of an oversampled rake demodulator, or more complex demodulator, in order to obtain initial symbol estimates that are more accurate. One could also potentially use this more complex demodulation in all PIC iterations if the corresponding increase in complexity was acceptable. Another possible enhancement involves the use of multiple chip-level PIC functions on different phases of the oversampled received signal, and the combining of the corresponding outputs. Finally, to improve performance, one can increase the number of cancellation iterations that are performed. In a chip-level ASIC implementation, this corresponds to an increase in the system clock rate up to some reasonable level. The number of cancellation iterations can also be increased by adding more parallelism to the architecture.

Figure 10:
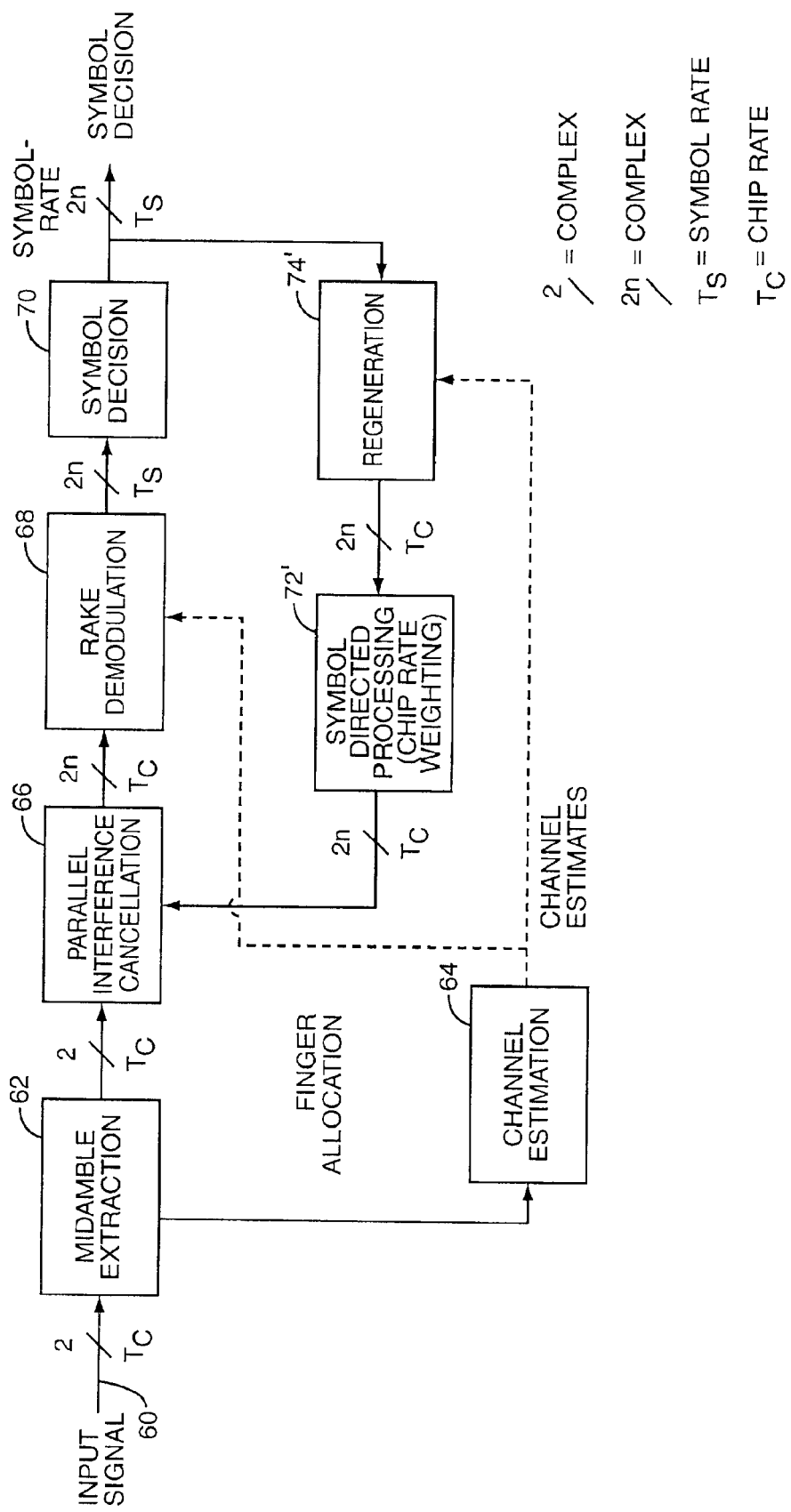
FIG. 10 is a schematic representation of multiple access interference cancellation circuitry according to an alternative embodiment of the present invention.

An architecture representative of PIC detector circuitry for an alternative embodiment of the present invention is illustrated in FIG. 10. This particular variant of PIC is also a "chip-level" PIC due to the fact that interference is cancelled at the chip-rate. In this embodiment, the regeneration functions and weighting functions are reversed from the embodiment described above, and the symbol processing occurs at the chip-rate on the regenerated signals. The regenerated signals are created based on symbol estimates instead of weighted symbol estimates. Accordingly, the following functions are provided in hardware, software, or a combination thereof: Midamble extraction 62, channel estimation 64, parallel interference cancellation 66, rake demodulation 68, symbol decision 70, signal regeneration 74', and symbol-directed processing 72'.

For the alternative embodiment, the following assumptions are made. A single chip-rate PIC application specific integrated circuit (ASIC) is used to process all users for a single antenna. Moreover, it is assumed that the oversampled, received signal is decimated to the chip-rate so that the input signal 60 is a composite signal represented by chip-rate complex samples. It is also assumed that channel estimation and other required pre-calculations occur during the reception of the second data field for a given time slot, and the weighting processing for a given time slot occurs during the reception of data for the next time slot.

Initially, the midamble extraction function 62 extracts the midamble from the received input signal 60 for a given slot, and a channel estimate is obtained for each user from the channel estimation function 64 in traditional fashion. The channel estimates may be used for chip-rate finger allocation in the constituent rake demodulator 68 and directly or indirectly to define the filter coefficients for the regeneration function 74'.

Upon reception, the PIC function 66 is bypassed and rake demodulation 68 separates the composite input signal 60 into M individual signals corresponding to the respective signals for each user. To determine the individual signals for each user during subsequent iterations, the PIC function 66 subtracts the weighted signals corresponding to all other individual signals from the composite input signal 60 for the given time slot. The weighted signals for each user are fed back via the regeneration and symbol-directed processing functions 74', 72'.

The rake demodulation 68 is used to demodulate each individual user's signal from the composite input signal 60. Demodulation may include despreading each individual signal with a unique channelization code and descrambling all individual signals using the base station's descrambling code. This operation is preferably performed at the chip-rate, producing a complex, symbol-rate output. Symbol estimates for each user are determined by applying the symbol decision function 70 to the outputs of the rake demodulator 68 in traditional fashion. The symbol decision function 70 may be implemented in hardware using symbol detection circuitry.

The regeneration function 74' essentially recreates estimates of the individual signals from the estimated symbols for each of the estimated users and individually processes the estimated symbols based on the corresponding channel estimates. Accordingly, regeneration 74' will typically involve the following steps for the detected, but yet unweighted, symbols for each user:

receiving the symbols at a symbol rate spreading the symbols with the user's specific chanelization code, scrambling the spread symbols with a base station's complex code, and filtering the spread and scrambled symbols with the user's channel estimate.

Notably, the detected symbols are received by the regeneration function 74' at the symbol-rate and provided to the symbol directed processing function at the chip-rate. The output of the regeneration function 74' provides signal estimates for each of the individual signals received for each user.

Symbol-directed processing 72' is then performed at the chip-rate on the signal estimates in order to enhance cancellation performance. At this point, each symbol has been spread, scrambled, and filtered and is represented by multiple chips. Instead of weighting each symbol based on the consistency of prior symbol estimates at the symbol-rate, the symbol-directed processing 72' effectively provides a weighting for each regenerated chip based on the consistency of previous estimates for the given chip from earlier iterations. In effect, the symbol-directed processing 72' provides regenerated signals for each user having individually weighted symbols based on the consistency of the symbols over multiple iterations. Since the symbol-directed processing occurs at the chip-rate on regenerated signals, leaky integrators, averaging integrators, and lookup tables can be used to provide the iterative weighting for each chip in the regenerated signal. The resulting signal is then provided to the PIC function 66 for cancellation.

This invention has been developed and simulated for a chip-level PIC detector, but it could also be applied to a symbol-level implementation with the expectation of similar performance enhancement. Those skilled in the art will recognize further improvements and modifications to the preferred embodiments of the present invention. All such improvements and modifications are considered within the scope of the concepts disclosed herein and the claims that follow.

What is claimed is:

1. A method for parallel interference cancellation comprising:

a) generating weighted symbol estimates from symbol estimates corresponding to a plurality of user signals forming at least part of an input signal, wherein each weighted symbol estimate is based on at least one previous symbol estimate for a given symbol;

b) processing the weighted symbol estimates to provide for:

i) modulation of the weighted symbol estimates corresponding to each user signal to provide individual modulated signals; and ii) filtering the individual modulated signals with channel estimates corresponding to the user signals to create individual regenerated signals;

c) for each user signal, subtracting individual regenerated signals corresponding to all other user signals from the input signal to create an individual signal;

d) demodulating each individual signal to provide a corresponding demodulated individual signal; and e) processing each demodulated individual signal to determine the symbol estimates for each symbol included therein.

2. The method of claim 1 further comprising repeating steps a through e prior to selecting symbol estimates as final symbol estimates.

3. The method of claim 2 wherein portions of the input signal over subsequent periods are processed in parallel with iterative processing of portions of the input signal over previous periods.

4. The method of claim 1 wherein the step of generating the weighted symbol estimates comprises providing a weighting for each symbol estimate that is based on a consistency of symbol estimates for each symbol.

5. The method of claim 4 wherein the weighting is relatively higher when the consistency of the symbol estimates is higher and relatively lower when the consistency of the symbol estimates is lower.

6. The method of claim 1 wherein the step of generating the weighted symbol estimates comprises implementing a leaky integrator function on successive symbol estimates for a given symbol to create the weighted symbol estimates for the given symbol such that the weighting for each symbol estimate is based on a consistency of symbol estimates for each symbol.

7. The method of claim 1 wherein the step of generating the weighted symbol estimates comprises implementing an averaging integrator function on successive symbol estimates for a given symbol to create the weighted symbol estimates for the given symbol such that the weighting for each symbol estimate is based on a consistency of symbol estimates for each symbol.

8. The method of claim 1 wherein the step of generating the weighted symbol estimates comprises accessing a lookup table based on a history of successive symbol estimates for a given symbol to determine the weighted symbol estimates for the given symbol.

9. The method of claim 1 wherein the step of processing the weighted symbol estimates and the step of demodulating use unique spreading codes for demodulating the individual signals and modulating the weighted symbol estimates.

10. The method of claim 9 wherein the step of processing the weighted symbol estimates and the step of demodulating further use a common spreading code for further demodulating the individual signals and further modulating the weighted symbol estimates.

11. A system for parallel interference cancellation in association with an input signal including a plurality of user signals comprising:

a) parallel interference cancellation circuitry adapted to subtract individual regenerated signals corresponding to all other user signals from the input signal to create an individual signal for each user signal;

b) demodulation circuitry for demodulating each individual signal to provide a corresponding demodulated individual signal;

c) symbol decision circuitry for processing each demodulated individual signal to determine symbol estimates for each symbol included therein;

d) symbol processing circuitry adapted to generate a weighted symbol estimate based on at least one previous symbol estimate for a given symbol for each symbol estimate; and e) regeneration circuitry adapted to:
  i) modulate the weighted symbol estimates corresponding to each individual signal to provide individual modulated signals; and
  ii) process the individual modulated signals with channel estimates corresponding to the individual signals to create the individual regenerated signals.

12. The system of claim 11 wherein the individual signals are iteratively processed prior to selecting symbol estimates as final symbol estimates.

13. The system of claim 12 wherein portions of the input signal over subsequent periods are processed in parallel with iterative processing of portions of the input signal over previous periods.

14. The system of claim 11 wherein the symbol processing circuitry provides a weighting for each symbol estimate that is based on a consistency of symbol estimates for each symbol.

15. The system of claim 14 wherein the weighting is relatively higher when the consistency of the symbol estimates is higher and relatively lower when the consistency of the symbol estimates is lower.

16. The system of claim 11 wherein the symbol processing circuitry is adapted to implement a leaky integrator function on successive symbol estimates for a given symbol to create the weighted symbol estimates for the given symbol such that the weighting for each symbol estimate is based on a consistency of symbol estimates for each symbol.

17. The system of claim 11 wherein the symbol processing circuitry implements an averaging integrator function on successive symbol estimates for a given symbol to create the weighted symbol estimates for the given symbol such that the weighting for each symbol estimate is based on a consistency of symbol estimates for each symbol.

18. The system of claim 11 wherein the symbol processing circuitry accesses a look-up table based on a history of successive symbol estimates for a given symbol to determine the weighted symbol estimates for the given symbol.

19. The system of claim 11 wherein the regeneration circuitry and the demodulation circuitry use unique spreading codes for demodulating the individual signals and modulating the weighted symbol estimates.

20. The system of claim 19 wherein the regeneration circuitry and demodulation circuitry use a common spreading code for further demodulating the individual signals and further modulating the weighted symbol estimates.

21. A system for parallel interference cancellation wherein a plurality of user signals form at least part of an input signal and weighted symbol estimates corresponding to the plurality of user signals are initially generated, the system comprising:

a) means for processing the weighted symbol estimates to provide for:
  i) modulation of the weighted symbol estimates corresponding to each user signal to provide individual modulated signals; and
  ii) filtering the individual modulated signals with channel estimates corresponding to the user signals to create individual regenerated signals;

b) means for subtracting individual regenerated signals corresponding to all other user signals from the input signal to create an individual signal for each user signal;

c) means for demodulating each individual signal to provide a corresponding demodulated individual signal;

d) means for processing each demodulated individual signal to determine symbol estimates for each symbol included therein; and e) means for generating a weighted symbol estimate based on a previous symbol estimate for a given symbol.

22. The system of claim 21 wherein the individual signals are iteratively processed prior to selecting symbol estimates as final symbol estimates.

23. The system of claim 22 wherein portions of the input signal over subsequent periods are processed in parallel with iterative processing of portions of the input signal over previous periods.

24. The system of claim 21 wherein the means for generating a weighted symbol is further adapted to provide a weighting for each symbol estimate that is based on a consistency of symbol estimates for each symbol.

25. The system of claim 24 wherein the weighting is relatively higher when the consistency of the symbol estimates is higher and relatively lower when the consistency of the symbol estimates is lower.

26. A method for parallel interference cancellation comprising:

a) processing symbol estimates corresponding to a plurality of user signals forming at least part of an input signal to provide for:
  i) modulation of the symbol estimates corresponding to each user signal to provide individual modulated signals; and
  ii) filtering the individual modulated signals with channel estimates corresponding to the user signals to create individual regenerated signals, wherein the individual regenerated signals are represented by chips;

b) generating weighted chips for each chip, wherein each weighted chip is based on at least one previous chip estimate for a given chip and the weighted chips for each individual regenerated signal form weighted individual signals;

c) for each user signal, subtracting weighted individual signals corresponding to all other user signals from the input signal to create an individual signal;

d) demodulating each individual signal to provide a corresponding demodulated individual signal; and e) processing each demodulated individual signal to determine the symbol estimates for each symbol included therein.

27. The method of claim 26 further comprising repeating steps a through e prior to selecting symbol estimates as final symbol estimates.

28. The method of claim 27 wherein portions of the input signal over subsequent periods are processed in parallel with iterative processing of portions of the input signal over previous periods.

29. The method of claim 26 wherein the step of generating the weighted chips comprises providing a weighting for each chip that is based on a consistency of chips for each symbol.

30. The method of claim 29 wherein the weighting is relatively higher when the consistency of the chips is higher and relatively lower when the consistency of the chips is lower.

31. A system for parallel interference cancellation in association with an input signal including a plurality of user signals comprising:
   a) parallel interference cancellation circuitry adapted to subtract weighted individual signals corresponding to all other user signals from the input signal to create an individual signal for each user signal;
   b) demodulation circuitry for demodulating each individual signal to provide a corresponding demodulated individual signal;
   c) symbol decision circuitry for processing each demodulated individual signal to determine symbol estimates for each symbol included therein;
   d) regeneration circuitry adapted to:
      i) modulate the symbol estimates corresponding to each individual signal to provide individual modulated signals; and
      ii) process the individual modulated signals with channel estimates corresponding to the individual signals to create individual regenerated signals; wherein the individual regenerated signals are represented by chips; and
   e) symbol processing circuitry adapted to generate weighted chips for each chip, wherein each weighted chip is based on at least one previous chip estimate for a given chip and the weighted chips for each individual regenerated signal form weighted individual signals.

32. The system of claim 31 wherein the individual signals are iteratively processed prior to selecting symbol estimates as final symbol estimates.

* * * * *